United States Patent [19]

Foley et al.

[11] Patent Number: 4,745,108
[45] Date of Patent: * May 17, 1988

[54] HEPARIN DERIVATIVES HAVING DECREASED ANTI-XA SPECIFICITY

[76] Inventors: Kevin M. Foley, 5757 Lynn St., Franklin, Ohio 45005; Charles C. Griffin, 710 Melissa Dr., Oxford, Ohio 45056; Eduardo Amaya, 811 Sands Ave., Monroe, Ohio 45050

[*] Notice: The portion of the term of this patent subsequent to May 17, 2005 has been disclaimed.

[21] Appl. No.: 898,127

[22] Filed: Aug. 20, 1986

[51] Int. Cl.$^4$ .................... A61K 31/725; C08B 37/10
[52] U.S. Cl. .................................... 514/56; 514/822; 536/21
[58] Field of Search ..................... 536/21; 514/56, 822

[56] References Cited

U.S. PATENT DOCUMENTS

| 3,835,112 | 6/1971 | Mardiguian | 536/21 |
| 4,331,697 | 3/1982 | Kudo et al. | 427/2 |
| 4,440,926 | 4/1984 | Mardiguian | 536/21 |

OTHER PUBLICATIONS

L. O. Andersson, Thrombosis Research, vol. 9, 1976, pp. 575–583.

*Primary Examiner*—John Rollins

[57] ABSTRACT

Ester derivatives of heparin are disclosed. These derivatives exhibit low anti-Xa activity in relation to global anticlotting activity.

17 Claims, No Drawings

HEPARIN DERIVATIVES HAVING DECREASED ANTI-XA SPECIFICITY

This invention relates to heparin derivatives possessing low Anti-Xa activity and more particularly to selected ester derivatives of heparin.

The chemical structure of heparin is complex. Heparin is not a single compound, but rather is a mixture of compounds. However, heparin is commonly thought to primarily be a polymeric substance made up of tetrasaccharide repeating units. On the average each tetrasaccharide repeating unit contains approximately 5 free hydroxyl groups and has a molecular weight of approximately 1229. The average molecular weight of commercially available heparin varies from about 10,000 to about 18,000. Thus, on the average, commercially available heparin contains approximately 8 to 15 tetrasaccharide repeating units.

The term heparin is used in the specification and the claims in its broadest sense, in order to designate either a commercial heparin of pharmaceutical grade or a crude heparin such as obtained by extraction from biological material, particularly from mammalian tissue.

Heparin is the most widely used agent for immediate management of most thromboembolic disorders, particularly, deepvein thrombosis and pulmonary and systemic emboli.

Heparin functions to block the coagulation cascade at various sites by interfering with a multiplicity of blood factors including factor Xa. It should be noted that heparin simultaneously depresses a large number of the coagulation factors participating in the creation and the maintenance of different forms of hypercoagulability. Thus, heparin's activity appears to be global rather than specific.

APTT and USP anticoagulant assays are recognized as measuring global anticoagulant activity. We prefer to use the APTT assay to measure global anticoagulant activity.

Much activity has been devoted to obtaining high anti-Xa potency in relation to global anticoagulant activity. U.S. Pat. Nos. 4,281,108; 4,438,261; 4,474,770; and 4,533,549 are examples of this. However there has been no success to date in synthesizing anticoagulants that exhibit low anti-Xa activity in relation to global anticoagulant activity. There would be utility and usefulness in being able to select anticoagulants with an anti-Xa activity to global anticoagulant activity that is lower than heparin as well as higher than heparin.

L. O. Andersson et al. in THROMBOSIS RESEARCH, Vol. 9, 1976 pages 575-583 discusses fractions of varying molecular weight isolated from heparin. The molecular weights of the fractions varied from 5,000 to 40,000. Anti-Xa and APTT tests were run on the various fractions. In general, the data indicated that the lower molecular weight fractions exhibited higher anti-Xa values in relation to the APTT values and higher molecular weight fractions exhibited lower anti-Xa values in relation to the APTT values.

We have been able to produce substances having lower anti-Xa activity in relation to global activity by using a novel approach that does not necessitate a cumbersome and inefficient separation of heparin into different fractions.

Unexpectedly, it has been observed that certain ester derivatives of heparin exhibit a low anti-Xa (Coatest anti-Xa test kit from KabiVitrum AB, Stockholm, Sweden) activity in relation to APTT (Activated Partial Thromboplastine Time, see Andersson et al., Thromb. Res. 9, 575 (1976)) activity, the latter being a measure of global anticlotting activity. This overcomes the problems associated with prior art methods of producing anticoagulants exhibiting low anti-Xa activity in relation to global anticoagulant activity.

The preferred method used to make said esters involves the reaction of a suitable acid chloride with heparin. Without limitation as to the scope of the invention, it is theorized that a preponderance of the ester groups formed by the reaction of an acid chloride with heparin result from the reaction of the free hydroxyl groups of heparin with the acid chloride.

The following examples are given by way of illustration only and are not to be considered as limiting of this invention.

EXAMPLE I 2 grams of heparin (porcine intestinal mucosa) was added to a 250 milliliter round bottom flask protected from the atmosphere by a drying tube. To this was added 24 milliliters of formamide and 24 milliliters of pyridine. The flask was placed in an oil bath maintained at 50° C. 12 milliliters of propionyl chloride was added slowly over a 3-4 hour period with agitation and agitation continued overnight.

50 milliliters of water was then added with agitation. The contents of the flask were then placed in a 2000 molecular weight cutoff dialysis bag (Spectrum Medical Industries, Los Angeles, Calif.). Dialysis was conducted against a 1% (w/v) sodium chloride solution for 24 hours. The dialysis against 1% sodium chloride was repeated three times. Dialysis was then conducted against water for 24 hours. The dialysis against water was then repeated three times.

The contents of the dialysis bag were then lyophilized to obtain a dry, white powder.

EXAMPLE II

The product of example I was analyzed for anti-Xa and found to exhibit a value of 5.4 units per milligram. The product of example I was analyzed for APTT and found to exhibit an APTT value of 6.9 units per milligram. The anti-Xa/APTT ratio was thus found to be 0.78. This compares to the known ratio of 1.0 for heparin.

EXAMPLE III

The number of ester groups per tetrasaccharide unit contained in the product of example I was measured following the method of S. Hestrin, J. BIOL. CHEM, vol 180, pages 249-261, 1949. Butyryl choline chloride was used as the ester standard. A theoretical formula weight of 1229 was used for a tetrasaccharide unit. The results indicated the presence of 3.5 propionyl groups per tetrasaccharide unit.

EXAMPLE IV

The infrared spectrum was obtained on the product of example I. An absorption peak was observed at 1736 $cm^{-1}$. This peak is characteristic of an ester group. Said peak was not present in the starting heparin.

EXAMPLE V 2 grams of heparin (porcine intestinal mucosa) was added to a 250 milliliter round bottom flask protected from the atmosphere by a drying tube. To this was added 24 milliliters of formamide and 24 milliliters of pyridine. The flask was placed in an oil bath maintained at 50° C. 20 milliliters of propionyl chloride was added slowly over a 3-4 hour period with agitation and agitation continued overnight.

50 milliliters of water was then added with agitation. The contents of the flask were then placed in a 2000 molecular weight cutoff dialysis bag (Spectrum Medical Industries, Los Angeles, Calif.). Dialysis was conducted against a 1% (w/v) sodium chloride solution for 24 hours. The dialysis against 1% sodium chloride was repeated three times. Dialysis was then conducted against water for 24 hours. The dialysis against water was then repeated three times.

The contents of the dialysis bag were then lyophilized to obtain a dry, white powder.

EXAMPLE VI

The product of example V was analyzed for anti-Xa and found to exhibit a value of 4.9 units per milligram. The product of example V was analyzed for APTT and found to exhibit an APTT value of 7.1 units per milligram. The anti-Xa/APTT ratio was thus found to be 0.69. This compares to the known ratio of 1.0 for heparin.

EXAMPLE VII

The number of ester groups per tetrasaccharide unit contained in the product of example V was measured following the method of S. Hestrin, J. BIOL. CHEM, vol 180, pages 249-261, 1949. Butyryl choline chloride was used as the ester standard. A theoretical formula weight of 1229 was used for a tetrasaccharide unit. The results indicated the presence of 2.9 propionyl groups per tetrasaccharide unit.

EXAMPLE VIII

The infrared spectrum was obtained on the product of example V. An absorption peak was observed at 1737 cm$^{-1}$. This peak is characteristic of an ester group. Said peak was not present in the starting heparin.

EXAMPLE IX 2 grams of heparin (porcine intestinal mucosa) was added to a 250 milliliter round bottom flask protected from the atmosphere by a drying tube. To this was added 24 milliliters of formamide and 24 milliliters of pyridine. The flask was placed in an oil bath maintained at 50° C. 6 milliliters of decanoyl chloride was added slowly over a 3-4 hour period with agitation and agitation continued overnight.

50 milliliters of water was then added with agitation. The contents of the flask were then placed in a 2000 molecular weight cutoff dialysis bag (Spectrum Medical Industries, Los Angeles, Calif.). Dialysis was conducted against a 1% (w/v) sodium chloride solution for 24 hours. The dialysis against 1% sodium chloride was repeated three times. Dialysis was then conducted against water for 24 hours. The dialysis against water was then repeated three times.

The contents of the dialysis bag were then lyophilized to obtain a dry, white powder.

EXAMPLE X

The product of example IX was analyzed for anti-Xa and found to exhibit a value of 21.1 units per milligram. The product of example IX was analyzed for APTT and found to exhibit an APTT value of 118.8 units per milligram. The anti-Xa/APTT ratio was thus found to be 0.18. This compares to the known ratio of 1.0 for heparin.

EXAMPLE XI

The number of ester groups per tetrasaccharide unit contained in the product of example IX was measured following the method of S. Hestrin, J. BIOL. CHEM, vol 180, pages 249-261, 1949. Butyryl choline chloride was used as the ester standard. A theoretical formula weight of 1229 was used for a tetrasaccharide unit. The results indicated the presence of 0.2 decanoyl groups per tetrasaccharide unit.

EXAMPLE XII

The infrared spectrum was obtained on the product of example IX. An absorption peak was observed at 1740 cm$^{-1}$. This peak is characteristic of an ester group. Said peak was not present in the starting heparin.

The above description is for the purpose of teaching the person skilled in the art how to practice the present invention. This description is not intended to detail all of the obvious modifications and variations of the invention which will become apparent upon reading. However, the applicants do intend to include all such obvious modifications and variations within the scope of their invention which is defined by the following claims.

We claim:

1. An ester of heparin characterized by an anti-Xa/APTT ratio less than 1.0.

2. An ester of claim 1 wherein the ester is prepared by reacting an acid chloride with heparin.

3. An ester of claim 1 wherein more than 50% of the ester groups are aliphatic.

4. An ester of claim 3 containing more than 0.1 ester groups per tetrasaccharide unit.

5. An ester of heparin containing more than 0.1 propionyl or decanoyl groups per tetrasaccharide unit.

6. An ester of claim 5 wherein the ester is prepared by reacting propionyl chloride or decanoyl chloride with heparin.

7. An ester of heparin formed by replacing the free hydroxyl groups of heparin with ester groups, said ester characterized by an anti-Xa/APTT ratio less than 1.0.

8. An ester of claim 7 wherein the ester is prepared by reacting an acid chloride with heparin.

9. An ester of heparin formed by replacing the free hydroxyl groups of heparin with ester groups, said ester containing more than 0.1 propionyl or decanoyl groups per tetrasaccharide unit.

10. An ester of claim 9 wherein the ester is prepared by reacting propionyl chloride or decanoyl chloride with heparin.

11. An ester of heparin characterized by an anti-Xa/APTT ratio less than 1.0, wherein the ester is prepared by reacting an acid chloride with heparin, and wherein more than 50% of the ester groups are aliphatic.

12. An ester of heparin characterized by an anti-Xa/APTT ratio less than 1.0, wherein the ester is prepared by reacting an acid chloride with heparin, wherein more than 50% of the ester groups are aliphatic and wherein the ester contains more than 0.1 ester groups per tetrasaccharide unit.

13. An ester of heparin formed by replacing the free hydroxyl groups of heparin with ester groups, said ester characterized by an anti-Xa/APTT ratio less than 1.0, wherein the ester is prepared by reacting an acid chloride with heparin, and wherein more than 50% of the ester groups are aliphatic.

14. An ester of heparin formed by replacing the free hydroxyl groups of heparin with ester groups, said ester characterized by an anti-Xa/APTT ratio less than 1.0, wherein the ester is prepared by reacting an acid chloride with heparin, wherein more than 50% of the ester groups are aliphatic and wherein the ester contains more than 0.1 ester groups per tetrasaccharide unit.

15. An ester of heparin formed by replacing the free hydroxyl groups of heparin with ester groups, said ester characterized by an anti-Xa/APTT ratio less than 1.0, wherein more than 50% of the ester groups are aliphatic.

16. An ester of heparin formed by replacing the free hydroxyl groups of heparin with ester groups, said ester characterized by an anti-Xa/APTT ratio less than 1.0, wherein more than 50% of the ester groups are aliphatic and wherein the ester contains more than 0.1 ester groups per tetrasaccharide unit.

17. A pharmaceutically active composition comprising a pharmaceutically acceptable carrier or diluent and, as the pharmaceutically active component, a product as claimed in any one of claims 1-16.

* * * * *